United States Patent [19]

Porta et al.

[11] Patent Number: 4,619,745

[45] Date of Patent: Oct. 28, 1986

[54] PROCESS FOR THE ELECTROCHEMICAL DECONTAMINATION OF WATER POLLUTED BY PATHOGENIC GERMS WITH PEROXIDE FORMED IN SITU

[75] Inventors: Augusto Porta, Carouge; Antonin Kulhanek, Le Lignon, both of Switzerland

[73] Assignee: Battelle Memorial Institute, Carouge, Switzerland

[21] Appl. No.: 659,319

[22] Filed: Oct. 10, 1984

[30] Foreign Application Priority Data

Oct. 11, 1983 [CH] Switzerland ......................... 5524/83

[51] Int. Cl.$^4$ ............................................. C02F 1/46
[52] U.S. Cl. .................................. 204/151; 204/149; 204/131
[58] Field of Search ............... 204/149, 131, 151, 152; 210/748

[56] References Cited

U.S. PATENT DOCUMENTS

| 3,966,571 | 6/1976 | Gagnon et al. | 204/149 |
| 4,161,435 | 7/1979 | Moeglich | 204/152 |
| 4,310,406 | 1/1982 | Smith et al. | 204/149 |
| 4,326,938 | 4/1982 | Das Gupta et al. | 204/149 |
| 4,445,990 | 5/1984 | Kim et al. | 204/149 |

Primary Examiner—Howard S. Williams
Assistant Examiner—B. J. Boggs, Jr.
Attorney, Agent, or Firm—Karl F. Ross; Herbert Dubno

[57] ABSTRACT

A process is disclosed for the electrochemical decontamination of polluted water in a cell containing a porous cathode in the presence of oxygen. The oxygen is reduced in the presence of the cathode and the electroreduction products are themselves used as depollution agents in the polluted water.

11 Claims, 2 Drawing Figures

PROCESS FOR THE ELECTROCHEMICAL DECONTAMINATION OF WATER POLLUTED BY PATHOGENIC GERMS WITH PEROXIDE FORMED IN SITU

FIELD OF THE INVENTION

The present invention relates to an electrochemical process for the decontamination of polluted water by pathogenic microorganisms and/or chemical products.

BACKGROUND OF THE INVENTION

There already exist, according to the prior art, a number of electrochemical or electrolytic processes for the decontamination of water.

First, according to U.S. Pat. No. 3,766,034, there is a process to eliminate ionic impurities from the water. The impurities include sulfates, phosphates and chlorides. According to this process the water to be purified is passed through an electrolytic cell containing an anode and a cathode and containing metallic particles (Pb or Al) covered by an ion-permeable resin membrane. The reference indicates that during the passage of current between the electrodes, the particles of metal react with the impurities and the resin membrane containing same to form products which are insoluble in water and which are retained in the cell.

The British Pat. No. 1,497,134 describes a process for the sterilization of water by anodic oxidation according to which the water is circulated through a cell containing an anode and a cathode each connected to a power source. The cell also contains, situated between said anode and cathode, a plurality of auxiliary metal electrodes which are resistant to oxidation and electrically isolated from one another as well as from the anode and the cathode. The effectiveness of such an arrangement arises from the very small distance maintained between the electrodes for the passage of water. The reference also indicates that when such an arrangement is used, it is perhaps desirable to prevent the influence of the hydrogen at the cathode from disturbing the oxidation caused by oxygen formed at the anode, by covering the cathode with a porous nonconductor.

In French Pat. No. 2,311,760 and U.S. Pat. No. 4,072,596, a process is disclosed for the decontamination of water by the application of an alternating current having a frequency of 0.5 to 800 Hz. The apparatus used to carry out this process includes a container divided into a succession of several compartments through which the water to be purified goes. The compartments connected to electrodes connected to a current source contain particle beds of diverse materials, such as metal oxide catalysts (preferably oxidation catalysts), for example oxides of tin, lead, bismuth, chromium, antimony, molybdenum and others. These catalysts can be deposited on a porous support such as alumina. The particles used according to the reference can also include diverse materials such as graphite, carbon, synthetic polymers (e.g. nylon, polyurethane), ceramics, perlite, etc. The particles of carbon or graphite are mentioned because of their conductivity, which augments the efficiency of the oxidation and contributes to the formation of "minicells" and equally facilitates the removal of impurities by absorption. In order to improve the efficiency, the apparatus is provided with refrigeration means.

French Pat. No. 2,244,842 discloses an apparatus to electrochemically treat waste water. This apparatus includes a tank containing planar electrodes of a perforated conductive material and a fluidized bed of nonconductive particles. The apparatus is used principally to eliminate metals dissolved in industrial waste water, for example copper.

French Pat. No. 2,318,115 and U.S. Pat. No. 4,048,030 disclose an apparatus similar to that previously discussed designed especially for the purification and sterilization of water. The apparatus comprises essentially a closed vessel having an inlet below and an outlet above for the water, and comprises at least two electrodes connected respectively to the positive and negative terminals of a direct source of electric current. The vessel also contains free particles having a density greater than that of the treated water so that the medium which contains the particles is at the bottom of the vessel. These particles are agitated by the movement of water current traversing the cell, so that a turbulent layer of particles is formed. These particles surround the electrode and their movement permanently maintain the electrodes clean by mechanical action. When the process is carried out in such an apparatus to electrolyze water containing for example 3 ppm chloride, without using an electrolysis membrane between the electrodes, there is no formation of chlorine, but only the liberation of oxygen at the anode. On the contrary, when such a membrane is used, the concentration of chloride is augmented in the interior of the anode compartment so as to be sufficient to form free chlorine. In the absence of chloride ions, other ions, for example carbonate or sulfate, present in the water, are concentrated in the anode compartment formed by the membrane and are oxidized to form persulfate or percarbonate, which equally constitute excellent oxidizing agents. All of the organic acids contained in the water can be oxidized in the same fashion.

French Pat. No. 2,215,399 and U.S. Pat. No. 3,725,226 disclose an electrochemical process using alternating current for the decontamination of polluted water contaminated with pathogenic agents. Both references refer to an earlier technique in which an aqueous medium containing the germs is subjected to a potential insufficient to provoke the electrolysis of the water, but sufficient to cause the transfer of current between the anode and the pathogenic agents to be destroyed. At all times according to these references, these earlier techniques suffer from an important deficiency which amounts to fouling of the electrodes, requiring periodic cleanings. As a consequence both references recommend the application in the case of the earlier technique of an alternating current, rather than a direct current, where the potential applied during the anodic phase is less than that necessary for the production of oxygen by electrolysis, even though concerning the cathode phase, the potential is sufficient so that hydrogen would be formed and liberated as a gas to thereby clean the electrode.

French Pat. No. 2,316,196 discloses an apparatus for the purification of waste water by anodic oxidation. This apparatus includes a cathode and an anode, and a mass of conductive particles placed in contact with the anode by the displacement of the water to be purified. The particles are positively charged and contribute to the efficient distribution of the oxidative effect throughout the liquid to be purified.

French Pat. No. 2,288,060 concerns an electrochemical process for the sterilization of water and its purification, especially water containing toxic residues of organic agents, in an implosion medium (of the order of 100 to 6000 V) capable of creating electric discharges between the electrodes.

U.S. Pat. No. 4,048,044 discloses an apparatus for the decontamination of water by anodic oxidation. The anode in this apparatus is silver, which besides producing oxygen at its surface, also has the property of anodically dissolving itself to liberate silver ion which augments the ability of the liberated oxygen to act as a bactericide.

The prior art techniques which have been described, though interesting and varied, all suffer from disadvantages which are as follows:

The complexity of the apparatus and the media which must be used (for example French Pat. No. 2,311,760) are often disproportionate with the results obtained. The efficiency is mediocre and the need for electrical energy to treat one cubic meter of water is relatively high. The narrowness of the range of application, that is certain techniques can be applied to a process for the decontamination of water containing germs but not to the elimination of chemical pollutants or heavy metals, while in the case of other prior art processes, the reverse situation is true, poses an additional problem.

OBJECT OF THE INVENTION

It is the object of the invention to provide a simple process which is both efficient and economically practical to permit the elimination from polluted water of practically all of the polluting agents (pathogenic germs, metal ions, chemical products, dyes, and others) with the consumption of a minimum of energy.

SUMMARY OF THE INVENTION

The process according to the invention complies with each of these conditions. It is characterized by the fact that oxygen gas is added to the polluted water subjected to treatment and circulation in the cationic zone, the oxygen content is adjusted, the water undergoes a cathodic electroreduction, in contact with the cathode, the products of electroreduction there acting as depollutant agents of the water and amplifying the effect of depollution due to the electric field between the electrodes.

Thus the oxygen can be added to the water traversing the cathodic zone arising from an exterior source and then be directly injected into the cathodic zone. Or the oxygen can be produced electrolytically by electrolysis of the polluted water at the anode within the electrolysis cell itself. In the latter case, which is the more simple and economic from the point of view of construction and operation, the oxygen migrates by diffusion from the anode zone to the cathode zone.

BRIEF DESCRIPTION OF THE DRAWING

The above and other objects, features and advantages of the invention will now be described in detail with reference to the accompanying drawing in which.

DETAILED DESCRIPTION

Figure 1:
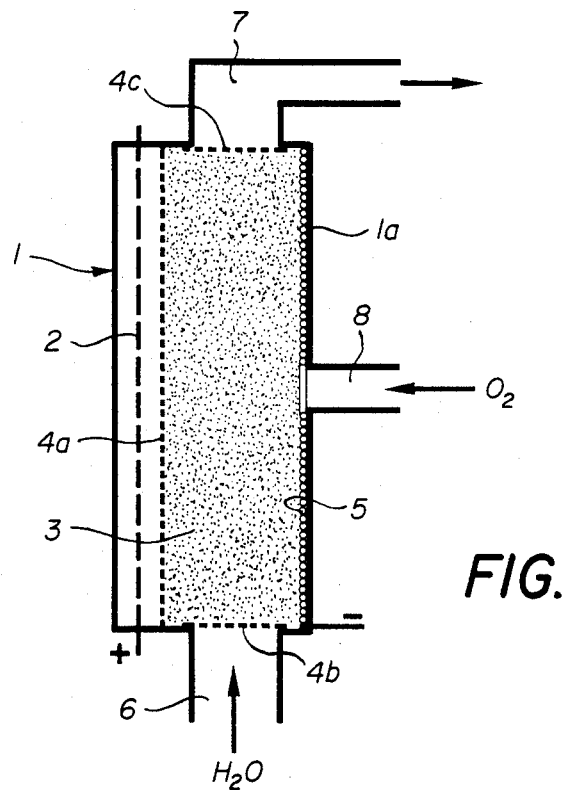
FIG. 1 is a schematic drawing in section of a cell for the electrochemical decontamination of water.

The cell for the electrolytic decomposition of water is represented in FIG. 1 and is constituted by an enclosure 1 containing an anode 2 and a cathode 3. The enclosure 1 is in the form of a chamber in which the thickness (taken in a transverse direction) is appreciably smaller than at least one of the other dimensions (longer and larger). Thus the chamber 1 can be in the form of a cylinder (as seen in FIG. 1) in which the diameter of one dimension is several times that of the height, or else in the form of a parallelopiped or prism. According to FIG. 1, where the chamber is cylindrical, the anode is constituted by a planar disc of inert conductive material, for instance a plate or grill of platinized titanium, stainless steel or graphite.

The anode is constituted by a cylindrical mass of small height in relation to its diameter (for example a ratio of 1 to 5 to 1 to 50) in the case of graphite or porous carbon. When the cathode is made of a porous material, a mass of carbon is used (having open pores) obtained by carbonization carried out protected from the air by an expanded synthetic resin, to provide a bed of adsorbent particles of carbon packed one against the other to ensure their electrical contact with the current and retained in the cathode compartment by grills of fine mesh 4a, 4b and 4c of conducting or insulating material or the fibers (or fiber tissues) of carbon or graphite packed together in the cathode compartment.

The anode 2 is connected to a current generator (not represented) the same as cathode 3, the latter by means of a mesh of graphite fibers 5 rolled or spiraled and packed up between the cathode and the circular wall corresponding to 1a of the cell.

The latter also includes an inlet 6 and an outlet 7 as well as an entrance 8 for the air or the oxygen under pressure.

In the operation of the cell, a stream of water traverses same to be decontaminated so that the waste water enters the cell through inlet 6 and leaves after depollution through outlet 7. During its path through the chamber 1, the water is in contact with the porous cathode 3. During the passage of current through the electrolyte, oxygen is formed at the anode, the gas migrates by simple diffusion, and/or by means of the movement of the water in the cell, toward the cathode, and the oxygen is then reduced when in contact with the cathode according to the following:

$$O_2 + H_2O + 2e^- \rightarrow HO_2^- + OH^- \tag{1}$$

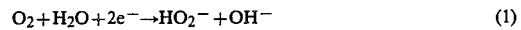

The product of electroreduction, that is $HO_2^-$, the hydroperoxide ion, is a very active decontamination agent, but very unstable and short-lived. In effect, the species can be decomposed to form active (nascent) oxygen according to the following:

$$HO_2^- \rightarrow OH^- + \tfrac{1}{2}O_2 \tag{2}$$

or perhaps the hydroperoxide species can be ultimately reduced according to the following:

$$HO_2^- + 2e^- + H_2O \rightarrow 3OH^- \tag{3}$$

The reduction according to reaction (3) is undesirable and amounts to very little in the present cell, and the majority of the $HO_2^-$ apparently contributes by itself or as an intermediate to produce active oxygen in order to destroy the pathogenic germs and decontaminate the water. Again, one can supply the oxygen gas by introducing the gas (or air) generated from an external source through opening 8. However, in a number of cases such an addition is not necessary unless the degree of pollution is very elevated. In the latter case it is especially advantageous to introduce the oxygen originating from an external source by bubbling or by supplying same through an inlet to traverse the porous cathode.

In some cases the carbon or graphite cathode acts during the decontamination of the water as the site of the electroreduction of reducible impurities inherently therein as well as an adsorption material. As electroreducible impurities those that can be mentioned include heavy metals such as lead, copper, mercury, nickel, iron and others, which are reduced to elemental form at the cathode and remain adsorbed in the cathode pores. Similarly the organic chemical impurities can be reduced either by electroreduction and cathode precipitation or through the oxidation by the $HO_2^-$ cited previously, and then adsorbed. Such impurities can include for example, phenols, pesticides, detergents, surfactants, pigments and solvents.

The cell according to the invention can be utilized with success to obtain water completely decontaminated and depolluted on either a small or a large scale depending on the dimensions of the cell (or the number of cells placed in parallel or series).

As an example, a cell which conforms to the present design having electrodes of a diameter of about 20 cm (the porous cathode having about a 12 mm thickness and containing 180 to 200 g of granulated active carbon having grains of 1 to 1.5 mm), effective depollution of river water can take place at a flow rate of up to 2 liters/min.

Concerning the regeneration of the present cell after a period of operation and when its efficiency is diminished, it is sufficient to isolate, by means of a by-pass, the incoming water to be decontaminated, and to circulate, in a closed circuit, a small quantity of water while inverting the polarity of the electrodes. During this step, the pollutants adsorbed on the cathode are desorbed and accordingly dissolve and pass into the wash water. The cell then contains the pollutants in a strong concentration which can be separately treated in order to eliminate the impurities.

It is mentioned that the present cell gives optimum results concerning the efficiency of depollution without periodic inversion of the polarity and for a very good reason, alternating current is not used as the power source. That is, there is an unexpected advantage according to the invention, inasmuch as normally, using alternating current, the impurities are partially and regularly desorbed in the treated water. However, in the present process where direct current is used, even if the process is interrupted, the pollutants remain fixed to the cathode. It is only during the period of regeneration that the deactivated or precipitated impurities on the cathode are desorbed under the influence current inversion and passed into the water.

The following examples illustrate the invention.

EXAMPLE 1

A cell containing electrodes in the form of discs having diameters of 25 cm, with the anode-cathode distance being 2 cm. What is utilized is artificially polluted water having $6 \times 10^4$ germs/liter (E. Coli). The water is circulated in the cell at various flow rates, under a current of 0.2 A/dm$^2$ using both direct and alternating current. The measure of the degree of contamination after passage through the cell has been carried out by the filtration method through the membrane (membrane "Millipore" 0.42 microns). After filtration of the water sample to be analyzed, the membranes are incubated for 48 hours at 37° C. and placed in petri dishes containing the nutrient medium "ENDO". Then the degree of residual contamination is determined by counting the colonies which have developed in the usual fashion. The operating parameters and the results are given in Table 1.

TABLE 1

| Current Operation (Hz) | Flow Rate (lit/min.) | Residual Contamination No. of Germs |
|---|---|---|
| Direct (0) | 1.2 | >1000 |
| " | 0.6 | >1000 |
| " | 0.3 | 1000 |
| " | 0.2 | 120–140 |
| " | 0.14 | 0 |
| " | 0.1 | 0 |
| Alternating (50) | 0.1 | >1000 |
| Alternating (10) | 0.1 | >1000 |
| Alternating (1) | 0.1 | >1000 |
| Alternating (0.5) | 0.1 | >1000 |

It is seen according to the results given above that, for the same residence time in the identical cells (e.g. 1 min for 100 ml), the water treated by direct current was depolluted whereas the water treated by alternating current treated at the same flow rate was not depolluted.

EXAMPLE 2

A cell identical with that of Example 1 is used and circulated therethrough are samples of polluted water by various quantities of microorganisms. The treatment is carried out with direct current under various current densities.

The results are given in Table 2.

TABLE 2

| Current Density (A/dm$^2$) | Flow Rate (lit./min.) | Contamination (No. of Germs $\times 10^4$) | |
|---|---|---|---|
| | | Before Treatment | After Treatment |
| 0.01 | 0.02 | 18 | 1 |
| 0.1 | 0.02 | 18 | 1 |
| 0.2 | 0.1 | 18 | 0 |
| 0.4 | 0.1 | 18 | 0 |
| 0.4 | 0.1 | 1800 | 0 |

After studying the results given above, it can be seen that flow rates up to 100 ml/min and current densities of 0.2 to 0.4 A/dm$^2$ are sufficient to depollute strongly contaminated water by pathogenic germs (up to $18 \times 10^6$/lit.).

EXAMPLE 3

A cylindrical cell containing electrodes is used having a diameter of about 18 cm (global surface of 3 dm$^2$). The cathode was formed of a bed of carbon particles (active) (EPIBON 1343116, Lurgi) having a thickness of 12 mm held in the cathode compartment by a nylon grill. The anode was platinized titanium. The distance between the electrodes was 20 mm; the air pressure through conduit 8 was 20 ml/min.

On circulates in the cell, river water strongly polluted by pathogenic germs as well as by chemical products (DCO=850 to 950 mg/lit.).

Water containing different concentrations of microorganisms is circulated through the cell at different flow rates and at different current densities.

The results are given in Table 3.

TABLE 3

| Current Density ($A/dm^2$) | Flow Rate (lit./min.) | Contamination (No. of Germs $\times 10^4$) Before Treatment | Contamination (No. of Germs $\times 10^4$) After Treatment |
| --- | --- | --- | --- |
| 0.3 | 0.1 | 30 | 0 |
| 0.3 | 0.25 | 30 | 0-1 |
| 0.3 | 0.5 | 30 | 3-4 |
| 0.3 | 0.25 | 300 | 1-2 |
| 0.3 | 0.5 | 300 | 10-20 |
| 1 | 0.1 | 60 | 0 |
| 1 | 0.25 | 60 | 0 |
| 1 | 0.5 | 60 | 1-2 |
| 1 | 0.25 | 300 | 0 |
| 1 | 0.5 | 300 | 0 |
| 1 | 1 | 300 | 40-120 |
| 1.36 | 1 | 30 | 0-1 |
| 1.36 | 0.1 | 300 | 0-1 |
| 1.36 | 0.5 | 300 | 15-25 |
| 1.36 | 1 | 300 | 500 |

The above results indicate that there is no advantage to operate at current densities greater than 1 $A/dm^2$ for flow rates in the area of 0.5 lit./min.

Furthermore, according to the tests in this example, there is a clearly perceptible diminution in the pollution by the chemical products so that the DCO value after treatment is of the order of 40 mg/lit.

The cell can also be employed under similar conditions as above except that no additional air is channeled through inlet 8, which in such a case would be blocked. In such a case the results obtained are not quite as good as the depollution figures given above.

EXAMPLE 4

In a cell similar to that of Example 3, river water is circulated which contains $6 \times 10^6$ germs/lit. at a flow rate of 2 lit./min. using various current densities.

Figure 2:
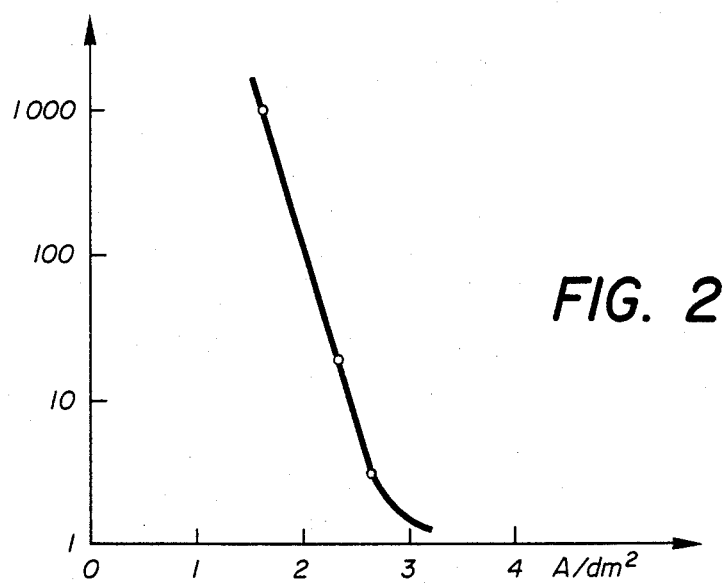
FIG. 2 shows graphically the effectiveness of the deactivation of the pathogenic germs in the water as a function of the density of the electrolysis current.

The results are presented in graphic form in FIG. 2 insofar as the number of residual germs after depollution (ordinate axis). According to the results, it is seen that at elevated flow rates, it is advantageous to operate at current densities greater than 2 $A/dm^2$. However, for maximum depollution (number of pathogenic germs=0), it is advantageous to work with low flow rates and current densities of the order of 0.5 to 1 $A/dm^2$.

It is noted that the voltage necessary to obtain the above-mentioned current densities varies in a large measure as a function of the ionic conductibility of the water to be polluted. Generally, it varies between a few volts and about 20 volts. Normally, the amount of current necessary to decontaminate the most polluted water media is of the order of 2.5 Kwh/$m^3$.

Furthermore, the present process has a tendency to change very slightly in response to the pH of the water to be treated. This change or falling off in results depends on both the flow rate and the current density, which should be of the order of 1 to 1.5 pH units (for example pH 8.2 to 6.8) at a flow rate of 0.25 lit./min. under a current density of 1 $A/dm^2$ and 8.2 to 7.3 for a flow rate of 2 lit./min.

The treated water can contain, after leaving the cell, a certain residual bacterial concentration which can be eliminated by treatment with an oxidizing agent equivalent to 1 to 2 ppm $H_2O_2$. The real degree of the residual bacterial level, however, has not been measured.

We claim:

1. A process for the decontamination of polluted water containing pathogenic germs as pollutants which comprises the following steps:
   (a) providing an electrolytic cell which comprises:
      (i) a housing;
      (ii) an elongate anode made of inert material in said housing;
      (iii) an elongate cathode of structurally porous carbon or graphite in said housing, freely permeable to water and extending parallel to said anode;
      (iv) a source of direct current in electrochemical contact with said anode and said cathode; and
      (v) a source of oxygen in contact with the polluted water to decontaminate the same;
   (b) feeding oxygen into said housing at said cathode;
   (c) passing the polluted water through the electrolytic cell and through said cathode parallel to said cathode and said anode, and in contact with both said cathode and said anode, while electrolyzing the polluted water to electrolytically reduce the oxygen at, and in contact with said cathode to hydroperoxide depollutant products, said products oxidizing said pathogenic germs to decontaminate the water; and
   (d) withdrawing the decontaminated water from the electrolytic cell.

2. The process defined in claim 1, wherein in step (a) the source of oxygen results from the electrolytic oxidation of the polluted water at the anode.

3. The process defined in claim 1, wherein in step (a), oxygen is added to the electrolytic cell from an external source.

4. The process defined in claim 1 wherein the current is D.C. and its density in the cell is 0.5 to 2 $A/dm^2$.

5. The process defined in claim 1 wherein the porous cathode containing pollutants removed from the polluted water is occasionally regenerated by the following steps:
   (a) isolating incoming polluted water from the electrolytic cell, having only a comparatively small amount of water within said cell;
   (b) reversing the polarity of the anode and the porous cathode, thereby changing the direction of the direct current flow applied thereto;
   (c) carrying out reverse dissolution of the porous cathode to desorb the pollutants into the water, thereby forming a contaminated solution of pollutants; and
   (d) separating the concentrated solution of pollutants from the electrolytic cell.

6. The process defined in claim 1, wherein the polluted water also contains heavy metal impurities as pollutants, the latter being eliminated during step (c) by electrolytic reduction on the porous cathode.

7. The process defined in claim 6 wherein the heavy metal impurities are eliminated during step (c) by deposition on the porous cathode.

8. The process defined in claim 1, wherein the polluted water also contains heavy metal impurities as pollutants, the latter being eliminated during step (c) by adsorption on the porous cathode.

9. The process defined in claim 1, wherein the polluted water also contains organic chemical impurities as pollutants, the latter being destroyed during step (c) by the electroreductive effect of the cathode.

10. The process defined in claim 1 wherein the polluted water also contains organic chemical impurities as pollutants, the latter being destroyed during step (c) by oxidation with $HO_2^-$ followed by elimination by adsorption on the porous cathode.

11. The process defined in claim 1 wherein the polluted water also contains organic chemical impurities as pollutants, the latter being eliminated during step (c) by electroreduction and cathodic precipitation on the porous cathode.

* * * * *